(12) United States Patent
Murakami et al.

(10) Patent No.: US 6,645,596 B1
(45) Date of Patent: Nov. 11, 2003

(54) OPTICAL DISK AND ULTRAVIOLET-CURING COMPOSITION FOR OPTICAL DISK

(75) Inventors: Kazuo Murakami, Kawagoe (JP); Takashi Kitsunai, Kitaadachi-gun (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/890,258

(22) PCT Filed: Dec. 7, 2000

(86) PCT No.: PCT/JP00/08665

§ 371 (c)(1),
(2), (4) Date: Aug. 6, 2001

(87) PCT Pub. No.: WO01/43128

PCT Pub. Date: Jun. 14, 2001

(30) Foreign Application Priority Data

Dec. 8, 1999 (JP) ............................................. 11-348673

(51) Int. Cl.$^7$ ................................................. B32B 3/02
(52) U.S. Cl. ..................................... 428/64.1; 428/65.2
(58) Field of Search ............................. 428/64.1, 64.4, 428/65.2, 913; 430/270.11, 495.1, 945; 369/283, 288

(56) References Cited

U.S. PATENT DOCUMENTS 6,007,887 A    12/1999  Hatwar et al.
6,180,200 B1 *  1/2001  Ha .............................. 428/64.1
2001/0036526 A1 * 11/2001 Fukuzawa ................... 428/64.4
2002/0032251 A1 *  3/2002 Ha ................................. 522/96
2002/0098361 A1 *  7/2002 Bennett ........................ 428/412

FOREIGN PATENT DOCUMENTS

| EP | 0 924 693 | 6/1999 |
| JP | 2-101656 | 4/1990 |
| JP | 10-46109 | 2/1998 |
| JP | 11-269433 | 10/1999 |
| JP | 11-273151 | 10/1999 |
| JP | 11-315132 | 11/1999 |
| JP | 2000-3530 | 1/2000 |

* cited by examiner

*Primary Examiner*—Elizabeth Mulvaney
(74) *Attorney, Agent, or Firm*—Armstrong, Westerman & Hattori, LLP

(57) ABSTRACT

An object is to provide a technique of imparting durability which is equal to that of existing types of DVD-5 and DVD-10 as well as DVD-9 using gold or a silicon based compound as a semitransparent film, to a DVD obtained by bonding two substrates having information recording layers, respectively, on each outermost layer of which a thin film of silver or an alloy composed primarily of silver is formed. Using an optical disc wherein ratios of error rates before and after an environmental test at 80° C. and 85% RH for 96 hours is 10 or less, and an ultraviolet curable composition for optical disc wherein a water absorption rate of the cured coating film is 2.0 wt % or less and a water-vapor permeability at a film thickness of 50 μm is 70 g/m$^2$·day or less, the object described above is achieved.

9 Claims, No Drawings

OPTICAL DISK AND ULTRAVIOLET-CURING COMPOSITION FOR OPTICAL DISK

TECHNICAL FIELD

The present invention relates to a bonded optical disc, and more particularly, relates to a bonded optical disc containing silver or an alloy primarily composed of silver in an information recording layer, and to an ultraviolet curable composition which is suitable for production of a bonded optical disc.

BACKGROUND ART

DVDs ("digital video discs" or "digital versatile discs") are produced by a method in which two discs, of which at least one disc has an information recording layer, are bonded together, and an ultraviolet curable composition is generally used as an adhesive.

In the case of read-only DVDs, the structure of the two bonded substrates may be of one of the following types or the like, which can be selected properly depending on the application: a type (DVD-10) in which polycarbonate substrates, are used which are each provided on one surface thereof with irregularities, called "pits", which correspond to recorded information and further, as a reflecting film for a laser beam for reading information, an aluminum layer, for example, is formed, to provide an information recording layer; a type (DVD-5) in which, as one of the substrates, a transparent polycarbonate substrate having no information recording layer is used; a type (DVD-9) in which one of such substrates is formed with a semitransparent film of a metal composed primarily of gold, a silicon compound, or the like to provide an information recording layer; and a type (DVD-18) in which each substrate has two information recording layers on one surface, and two such substrates are bonded together.

The semitransparent film of DVD-9 is primarily composed of gold, a silicon compound or the like. However, gold has a drawback in that it is disadvantageous in cost because of its very high price, while the silicon compound has a drawback in that formation of a film is very difficult.

On the other hand, silver or an alloy composed primarily of silver is suitable for use as a semitransparent film for DVD-9 because it has a lower price compared to gold and can be easily formed into a film. However, since silver or an alloy composed primarily of silver is chemically unstable, when using a conventional ultraviolet curable adhesive for DVDs, it causes deterioration of the surface when left in high temperature and high humidity environments for a long time, thus leading to errors in reading recorded information, poor appearance or the like.

Japanese Patent Application, First Publication No. Hei 9-11626 discloses that a fluororesin coating having a low water absorption rate is formed as a protective layer for silver or an alloy composed primarily of silver. However, the fluororesin coating has poor adhesion and is not ultraviolet-curable, thus making it difficult to use it as it is in a current DVD production process using an ultraviolet curable adhesive. Therefore, the fluororesin coating is not suitable for practical use.

As described above, although silver or an alloy composed primarily of silver is quite suitable for use in a semitransparent film for DVDs, an ultraviolet curable composition having sufficient protective characteristics has not yet been developed, and therefore, DVDs using silver or an alloy composed primarily of silver have not yet been commercialized.

DISCLOSURE OF THE INVENTION

An object to be achieved by the present invention is to provide DVDs having durability equal to that of existing DVDs of the DVD-5 and DVD-10 types as well as those of the DVD-9 type using gold or a silicon based compound as a semitransparent film, by using the above-described disc wherein a thin film of silver or an alloy composed primarily of silver is formed, and to provide an adhesive composition which does not cause deterioration of the thin film of silver or an alloy composed primarily of silver.

The present inventors have carried out intensive research to solve the above problems, and as a result, have found that durability equal to that of a conventional optical disc using gold or a silicon based compound can be realized by observing the increase in the error rate after an environmental test in a bonded optical disc using a thin film of silver or an alloy composed primarily of silver as a semitransparent film in an outermost layer of an information recording layer, and setting the error rate in a specified range, and that a remarkable effect can be obtained by setting a water absorption rate and a water-vapor permeability of a cured coating, and thus the present inventors have achieved the present invention.

That is, the present invention provides an optical disc comprising two substrates having information recording layers, respectively, a thin film of silver or an alloy composed primarily of silver being formed on an outermost layer of the information recording layer of at least one substrate, said two substrates being bonded together by an ultraviolet curable composition, wherein the optical disc is characterized in that ratios of error rates before and after an environmental test at 80° C. and 85% RH for 96 hours are 10 or less.

As the substrate used in the optical disc of the present invention, those typically used as a substrate for optical disc can be used and, particularly preferably, a polycarbonate substrate can be used.

The "alloy composed primarily of silver" used in the optical disc of the present invention includes, for example, silver incorporated with several % of palladium, copper, or the like therein.

As used herein, ratios of error rates are defined as ratios of PI error rates before and after an environmental test (error rate after the environmental test/error rate before the environmental test). As used herein, the term "error rates" has the same meaning as that used by those skill in the art in the case of evaluating an optical disc such as a DVD or the like.

The environmental test is conducted by allowing an optical disc to remain in an environment of 80° C. and 85% RH for 96 hours. In this environmental test, an apparatus such as a thermo-hygrostat or the like can be used.

The optical disc of the present invention is preferably a DVD ("digital video disc" or "digital versatile disc"), for example, a read-only DVD such as one of the DVD-5, DVD-10, DVD-9 or DVD-18 type, a writable DVD such as a DVD-R, or a rewritable DVD such as a DVD-RAM, DVD-RW, or DVD+RW, and the optical disc is more preferably a DVD-9. The optical disc of the present invention is not limited to these DVDs and may be, for example, an optical disc in which a cover layer having a thickness of about 0.1 mm is formed by bonding a transparent film or coating an ultraviolet curable composition on a substrate having a thickness of about 1.1 mm, an optical disc having a structure comprising three substrates having a thickness of 0.6 mm or less bonded to each other or the like.

If there is no change in the error rate before and after the environmental test, PI error rate ratios before and after the environmental test are 1. In general, since the error rates are determined by characteristics of each disc substrate, the error rates vary considerably, thus making it difficult to set to a fixed value for a bonded type disc. Such a relative ratio makes possible discussion on a uniform basis.

Furthermore, the present invention provides an ultraviolet curable composition for an optical disc, which is used in the production of an optical disc comprising two substrates having information recording layers, respectively, a thin film of silver or an alloy composed primarily of silver being formed on an outermost layer of the information recording layer of at least one substrate, said two substrates being bonded together by an ultraviolet curable composition, wherein the ultraviolet curable composition is characterized in that a water absorption rate of the cured coating film is. 2.0 wt % or less and a water-vapor permeability at a film thickness of 50 μm is 70 g/m$^2$·day or less. Preferably, the ultraviolet curable composition is composed primarily of an ultraviolet curable compound composed of a (meth)acrylate having a alicyclic structure, and a photopolymerization initiator.

The ultraviolet curable composition for an optical disc of the present invention may be used as an adhesive of a bonded disc and may be used as a protective coating agent for a thin film of an alloy of silver or an alloy composed primarily of silver. In any case, an optical disc having an excellent durability can be obtained.

As the ultraviolet curable composition used in the ultraviolet curable composition of the present invention, monofunctional (meth)acrylate and polyfunctional (meth)acrylate can be used as a polymerizable monomer component. These may be used singly, or two or more thereof may be used in combination. In the present invention, acrylate and methacrylate together are called (meth)acrylate.

The polymerizable monomer which can be used in the present invention includes, for example, the following.

The monofunctional (meth)acrylate includes, for example, (meth)acrylate and the like, having a group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl, isobornyl, dicyclopentanyl, dicyclopentenyl, dicyclopentenyloxyethyl or a similar group as a substituent group.

In addition, the polyfunctional (meth)acrylate includes, for example, di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, dipropylene glycol, tripropylene glycol, polypropylene glycol, etc., di(meth) acrylate of tris(2-hydroxyethyl)isocyanurate, di(meth) acrylate of a diol obtained by adding 4 moles or more of ethylene oxide or propylene oxide to 1 mole of neopentyl glycol, di(meth)acrylate of a diol obtained by adding 2 moles of ethylene oxide or propylene oxide to 1 mole of bisphenol A, di- or tri(meth)acrylate of a triol obtained by adding 3 moles or more of ethylene oxide or propylene oxide to 1 more of trimethylolpropane, di(meth)acrylate of a diol obtained by adding 4 moles or more of ethylene oxide or propylene oxide to 1 more of bisphenol A, trimethylolpropane tri(meth)acrylate, pentaerythritol tri(meth)acrylate, dipentaerythritol poly(meth)acrylate, ethylene oxide-modified alkylated phosphoric acid (meth)acrylate, etc.

To control the water absorption rate and water-vapor permeability, (meth)acrylates having an alicyclic substituent such as cyclohexyl, isobornyl, dicyclopentanyl, dicyclopentenyl, dicyclopentenyloxyethyl, tricyclodecanedimethanol, etc., among the above substituents are preferably used.

Further, those which can be used in combination similarly to the polymerizable monomer include as polymerizable oligomers, polyester (meth)acrylate, polyether (meth) acrylate, epoxy (meth)acrylate, urethane (meth)acrylate, etc.

In the present invention, the photopolymerization initiator may be any known, commonly used one with which ultraviolet curable compounds represented by the polymerizable monomers and/or polymerizable oligomers used can be cured. As the photopolymerization initiator, molecule cleaving type or hydrogen eliminating type ones are suitable for the present invention.

The photopolymerization initiators preferably used in the present invention include benzoin isobutyl ether, 2,4-diethylthioxanthone, 2-isopropylthioxanthone, benzyl, 2,4,6-trimethylbenzoyldiphenylphosphine oxide, 2-benzyl-2-dimethylamino-1-(4-morpholinophenyl)butan-1-one, bis(2,6-dimethoxybenzoyl)-2,4,4-trimethylpentylphosphine oxide, etc., and further, as molecule cleaving type ones other than these, 1-hydroxycyclohexyl phenyl ketone, benzoin ethyl ether, benzyl dimethyl ketal, 2-hydroxy-2-mehtyl-1-phenyl-propan-1-one, 1-(4-isopropylphenyl)-2-hydroxy-2-methylpropan-1-one and 2-methyl-1-(4-methylthiophenyl)-2-morpholino-propan-1-one, etc., may be used in combination. Further, benzophenone, 4-phenylbenzophenone, isophthalophenone, 4-benzoyl-4'-methyl-diphenyl sulfide, etc., which are hydrogen eliminating type photopolymerization initiators, may be used in combination.

In combination with the above photopolymerization initiator can be used, as a sensitizer, amines that do not undergo addition polymerization reaction with the above-described polymerizable components, such as, for example, triethylamine, methyldiethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. Of course, it is preferred to select for use the above-described photopolymerization initiators and sensitizers from those which are superior in solubility in the curable components and which do not interfere with ultraviolet light transmission.

It is preferred to use ultraviolet curable compositions which are liquid at room temperature to 40° C. It is preferred not to use solvents. If solvents are used, it is preferred to limit the amount to a level as small as possible. In the case where coating of the above-described composition is performed using a spin coater, it is preferred to adjust the viscosity to 20 to 1,000 mPa·s and in the case in which a relatively thick film is to be obtained, it may be adjusted to 100 to 1,000 mPa·s.

The composition of the present invention may, if necessary, have blended therein other additives such as thermal polymerization inhibitors, antioxidants represented by hindered phenols, hindered amines, phosphites, etc., plasticizers, silane coupling agents represented by epoxysilane, mercaptosilane, (meth)acrylsilane, etc., and the like in order to improve various properties. These are selected for use from those which are superior in solubility in curable components, and which do not interfere with ultraviolet transmission.

BEST MODE FOR CARRYING OUT THE INVENTION

Embodiments of the present invention will be described in detail based on preferred embodiments of the present invention with reference to the DVD-9 type.

First, one disc-like plastic substrate in which a 40–60 nm metal thin film is sputtered on irregularities called "pits", corresponding to the recorded information, and one disc-like plastic substrate in which a 10–30 nm semitransparent thin film of gold is sputtered on irregularities called "pits", corresponding to the recorded information, are prepared.

Then, an ultraviolet curable composition is prepared such that a water absorption rate of the cured coating film is 2.0 wt % or less and a water-vapor permeability at a film thickness of 50 $\mu$m is 70 g/m$^2$·day or less, using two kinds or more of polyfunctional (meth)acrylate having two or more (meth)acryloyl groups as a polymerizable monomer or polymerizable oligomer, and optionally a monofunctional monomer, as needed, and further using photopolymerization initiators in an amount of 2 to 7 parts by weight per 100 parts by weight of the ultraviolet curable composition. Since the water absorption rate and water-vapor permeability are easily controlled, a (meth)acrylate having an alicyclic structure is preferably used as the polymerizable monomer or polymerizable oligomer.

The above-described composition is coated on the metal thin film surface of a 40–60 nm metal thin film-sputtered disc-like plastic substrate and a 10–30 nm silver or silver alloy semitransparent film-sputtered disc-like plastic substrate is bonded such that the semitransparent film surface is opposed to the metal thin film surface. Ultraviolet light is irradiated from one side or both sides of the bonded disc to unite the two to form a DVD-9 disc.

Irradiation with ultraviolet light can be performed by a continuous light irradiation system using, for example, metal halide lamp, medium pressure mercury lamp, etc., and can also be performed by a flash irradiation system described in U.S. Pat. No. 5,904,795. The flash irradiation system is particularly preferred in that curing can be performed efficiently.

The adhesive layer of the DVD-9 thus obtained is composed of a cured coating film wherein the water absorption rate of the cured coating film is 2.0 wt % or less and the water-vapor permeability at a film thickness of 50 $\mu$m is 70 g/m$^2$·day or less, and wherein the ratios of error rates before and after an environmental test at 80° C. and 85% RH for 96 hours is 10 or less. This optical disc does not undergo any change in appearance even after storage for a long time and has durability which is equal to that of a conventional DVD-9 using gold or a silicon based compound.

The same durability can be obtained even if the DVD-9, wherein a semitransparent film of silver or a silver alloy is protectively coated with the above ultraviolet curable composition, is produced by bonding disc substrates together using a freely selected ultraviolet curable composition. The protective coating can be obtained, for example, by coating an ultraviolet curable composition in a thickness of about 10 $\mu$m using a spin coater, and curing the ultraviolet curable composition by irradiation with ultraviolet light. In this case, the ultraviolet curable composition is preferably prepared such that the viscosity is 20 to 300 mPa·s. Irradiation with ultraviolet light can be performed by a continuous light irradiation system using, for example, a metal halide lamp, medium pressure mercury lamp, etc., in the same manner as in the case of bonding, and can also be performed by a flash irradiation system. The continuous light irradiation system is preferred because an existing protective coating apparatus for CDs can be used.

EXAMPLES

Next, the present invention will be described in detail by examples. However, the present invention is not limited to these examples. In the examples, "parts" indicates "parts by weight".

Example 1

Twenty six (26) parts UNIDIC V-5500 (manufactured by DAINIPPON INK AND CHEMICALS, INC.) as bisphenol A type epoxyacrylate, 30 parts of tricyclodecanedimethylol diacrylate, 10 parts of bisphenol A type ethylene oxide-modified diacrylate, 15 parts of tripropylene glycol diacrylate, 11 parts of isobornyl acrylate, 1.5 parts of ethylene oxide-modified trimethylolpropane triacrylate, 0.2 parts of ethylene oxide-modified phosphoric acid methacrylate, 0.3 parts of ethyl dimethylaminobenzoate, and 2 parts of 2,4,6-trimethylbenzoyldiphenylphosphine oxide and 4 parts of 1-hydroxycyclophenyl ketone as a photopolymerization initiator were mixed and dissolved with heating at 60° C. for one hour to prepare a pale yellow transparent ultraviolet curable composition.

Example 2

Eighteen (18) parts of FAU-74-2 (manufactured by DAINIPPON INK AND CHEMICALS, INC.) as urethane acrylate, 77 parts of tricyclodecanedimethylol diacrylate, 4.5 parts of trimethylolpropane triacrylate, 0.2 parts of ethylene oxide-modified phosphoric acid methacrylate, 0.3 parts of ethyl dimethylaminobenzoate, and 5 parts of 1-hydroxycyclophenyl ketone as a photopolymerization initiator were mixed and dissolved with heating at 60° C. for one hour to prepare a pale yellow transparent ultraviolet curable composition.

Comparative Example 1

Twenty (20) parts of FAU-504 (manufactured by DAINIPPON INK AND CHEMICALS, INC.) as urethane acrylate, 21 parts of UNIDIC V-5500 (manufactured by DAINIPPON INK AND CHEMICALS, INC.) as bisphenol A type epoxyacrylate, 13 parts of tripropylene glycol diacrylate, 10 parts of tetrahydrofurfuryl acrylate, 17 parts of 2-hydroxy-3-phenoxypropyl acrylate, 11 parts of ethylcarbitol acrylate, 1.5 parts of ethylene oxide-modified trimethylolpropane triacrylate, 0.2 parts of ethylene oxide-modified phosphoric acid methacrylate, 0.3 parts of ethyl dimethylaminobenzoate, and 2 parts of 2,4,6-trimethylbenzoyldiphenylphosphine oxide and 4 parts of 1-hydroxycyclophenyl ketone as a photopolymerization initiator were mixed and dissolved with heating at 60° C. for one hour to prepare a pale yellow transparent ultraviolet curable composition.

Comparative Example 2

Twenty (20) parts of DICLITE UE-8200 (manufactured by DAINIPPON INK AND CHEMICALS, INC.) as bisphenol A type epoxyacrylate, 34.5 parts of trimethylolpropane triacrylate, 19 parts of bisphenol A type ethylene oxide-modified diacrylate, 10 parts of tripropylene glycol diacrylate, 11 parts of neopentylglycol diacrylate, 0.2 parts of ethylene oxide-modified phosphoric acid methacrylate, 0.3 parts of ethyl dimethylaminobenzoate, and 2 parts of 2-benzyl-2-dimethylamino-1-(4-morpholinophenyl)-butanone-1,2 parts of benzophenone and 1 part of dimethylaminoacetophenone as a photopolymerization initiator were mixed and dissolved with heating at 60° C. for one hour to prepare a pale yellow transparent ultraviolet curable composition.

(Evaluation of Characteristics)

Using the compositions obtained in the Examples and Comparative Examples described above, the water absorption rate, the water-vapor permeability and the ratios of error rates of the DVD-9 bonded discs as well as the appearance after the environmental test were evaluated by the following test methods 1, 2, and 3. The results are summarized in Table 1.

(Test Method 1: Measurement of Water Absorption Rate of Cured Coating Film)

The ultraviolet curable composition was coated on a glass plate to a film thickness of about 100 $\mu$m. Then, under a nitrogen atmosphere, using as a UV lamp an M03-L31 (120 W/cm metal halide lamp, with a cold mirror) manufactured by EYE GRAPHICS CO., LTD., irradiation of 0.5 J/cm$^2$ (an ultraviolet actinometer: UVPF-36, manufactured by EYE GRAPHICS CO., LTD.) at a lamp height of 10 cm was carried out to prepare a cured coating film. The water absorption rate of the cured coating film was measured according to the Method B of JIS K7209-1984.

(Test Method 2: Measurement of Water-vapor Permeability of Cured Coating Film)

The ultraviolet curable composition was interposed between two glass plates to a film thickness of about 100 $\mu$m using a spacer. Then, under a nitrogen atmosphere, using as a UV lamp an M03-L31 (120 W/cm metal halide lamp, with a cold mirror) manufactured by EYE GRAPHICS CO., LTD., irradiation of 1.2 J/cm$^2$ (an ultraviolet actinometer: UVPF-36, manufactured by EYE GRAPHICS CO., LTD.) at a lamp height of 10 cm was carried out to prepare a cured coating film, and test pieces (10 cm square) having a uniform thickness were made by peeling off from the glass plate.

The water-vapor permeability of the cured coating film was measured by using a LYSSY type automatic water-vapor permeability tester L-80. Since an actual thickness of the adhesive layer of the DVD is about 50 $\mu$m, a value adjusted in terms of 50 $\mu$m was taken as the value of the water-vapor permeability.

(Test Method 3: Environmental Test on DVD-9 Bonded Disc)

On a polycarbonate disc on which pits for recording information are formed and aluminum is sputtered to 50 nm, the above-described composition was coated using a dispenser, and this polycarbonate disc was overlaid with a polycarbonate disc on which an alloy composed primarily of silver is sputtered as a semitransparent film. Then, using a spin coater, the discs were rotated so that the film thickness of the cured coating film became about 50–60 $\mu$m. Then, using a xenon flash irradiation apparatus (SBC-04 manufactured by Ushio Inc.), 10 shots of irradiation with ultraviolet light were performed at a programmed voltage of 1800 V in air from the side of the substrate with the silver alloy semitransparent film to produce a DVD-9 type bonded disc.

Environmental tests were conducted in which the bonded disc was left in a thermo-hygrostat (PR-2KP) manufactured by TABAI ESPEC CORP. under a high temperature and high humidity environment of 80° C. and 95% RH for 96 hours and evaluation of the signal properties before and after the environmental test (measurements of error rates) were performed by using an apparatus (SDP-1000) manufactured by PULSTEC INDUSTRIAL CO., LTD. The ratios of error rates before and after the test (after the environmental test/before the environmental test) were determined. The maximum value of error rates was taken as the measured value. The appearance of the disc after the environmental test was visually observed and the state of the silver alloy semitransparent film was evaluated.

TABLE 1

|  | Example 1 | Example 2 | Comp. Example 1 | Comp. Example 2 |
|---|---|---|---|---|
| Water absorption of cured coating film (wt %) | 1.5 | 0.9 | 3.0 | 2.1 |
| Water-vapor permeability (value reduced in terms of 50 (m, g/m$^2$ · day) | 30 | 46 | 700 | 75 |
| Ratios of error rates | 6 | 2 | impossible to measure | impossible to measure |
| Evaluation results of visual observation | good | good | blackened | blackened |

As is apparent from Table 1, the bonded discs using the compositions of Examples 1 and 2 as the adhesive layer, in which the water-vapor permeability of the cured coating film is 2.0 wt % or less and the water-vapor permeability at a film thickness of 50 $\mu$m is 70 g/m$^2$·day or less, exhibited the ratios of error rates of 10 or less and had excellent durability because there was no change in appearance, as a result of the environmental test of DVD-9 using the silver alloy semitransparent film.

On the other hand, with respect to DVD-9 using the compositions obtained in Comparative Examples 1 and 2, the silver alloy film blackened, as a result of the environmental test, and the state of the film was deteriorated such that normal signal detection cannot be performed and also the measurement of the error rates cannot be performed.

Application Example

The composition of Example 1 was coated on a silver alloy semitransparent film to a film thickness of about 10 $\mu$m. Then, using as a UV lamp an M03-L31 (120 W/cm metal halide lamp, with a cold mirror) manufactured by EYE GRAPHICS CO., LTD., irradiation of 0.5 J/cm$^2$ at a lamp height of 10 cm was carried out to form a protective coating. Using this substrate, DVD-9 bonded with the composition of Comparative Example 1 was made by the test method 3. The ratio of error rate of the bonded disc was 6 and exhibited excellent durability because of no change of the appearance.

INDUSTRIAL APPLICABILITY

It becomes possible to produce a DVD-9 in which deterioration of silver or an alloy composed primarily of silver is prevented and which also has excellent durability of the bonded disc after the high temperature and high humidity environmental test and very high reliability, by using the composition of the present invention as the adhesive layer or the protective coating. A disc having very high reliability can also be produced when using those in which a thin film of silver or an alloy composed primarily of silver is formed on a reflective film of an outermost layer of an information recording layer in a writable DVD-R, a rewritable DVD-RAM, DVD-RW, DVD+RW or the like.

What is claimed is:

1. An optical disc comprising two substrates having information recording layers, respectively, a thin film of silver or an alloy composed primarily of silver being formed on an outermost layer of the information recording layer of at least one substrate, said two substrates being bonded together by an ultraviolet curable composition, wherein the optical disc is characterized in that ratios of error rates before and after an environmental test at 80° C. and 85% RH for 96 hours is or less.

2. The optical disc as claimed in claim 1, wherein said two substrates are bonded together by an ultraviolet curable composition in which a water absorption rate of the cured coating film is 2.0 wt % or less and a water-vapor permeability at a film thickness of 50 μm is 70 g/m²·day or less.

3. The optical disc as claimed in claim 2, wherein the ultraviolet curable composition is composed primarily of an ultraviolet curable compound composed of a (meth)acrylate having a alicyclic structure, and a photopolymerization initiator.

4. The optical disc as claimed in claim 1, wherein the thin film of silver or an alloy composed primarily of silver is coated protectively with an ultraviolet curable composition in which the water absorption rate of the cured coating film is 2.0 wt % or less and the water-vapor permeability at a film thickness of 50 μm is 70 g/m²·day or less.

5. The optical disc as claimed in claim 4, wherein the ultraviolet curable composition, with which the thin film of silver or an alloy composed primarily of silver is coated, is composed primarily of an ultraviolet curable compound composed of a (meth)acrylate having a alicyclic structure, and a photopolymerization initiator.

6. The optical disc as claimed in claim 1, which is a read-only DVD.

7. The optical disc as claimed in claim 1, which is a rewritable or writable DVD.

8. An ultraviolet curable composition for optical disc, which is used in the production of an optical disc comprising two substrates having information recording layers, respectively, a thin film of silver or an alloy composed primarily of silver being formed on an outermost layer of the information recording layer of at least one substrate, said two substrates being bonded together by an ultraviolet curable composition, wherein the ultraviolet curable composition is characterized in that a water absorption rate of the cured coating film is 2.0 wt % or less and a water-vapor permeability at a film thickness of 50 μm is 70 g/m²·day or less.

9. The ultraviolet curable composition for optical disc as claimed in claim 8, which is composed primarily of an ultraviolet curable compound composed of a (meth)acrylate having a alicyclic structure, and a photopolymerization initiator.

* * * * *